(12) United States Patent
Vasel

(10) Patent No.: US 11,161,590 B2
(45) Date of Patent: Nov. 2, 2021

(54) REINFORCED SUPERPLASTIC FORMED AND DIFFUSION BONDED STRUCTURES

(71) Applicant: The Boeing Company, Chicago, IL (US)

(72) Inventor: Corey Vasel, Arnold, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/587,669

(22) Filed: Sep. 30, 2019

(65) Prior Publication Data
US 2021/0094671 A1 Apr. 1, 2021

(51) Int. Cl.
| | |
|---|---|
| *B32B 3/12* | (2006.01) |
| *B32B 3/26* | (2006.01) |
| *B64C 1/38* | (2006.01) |
| *B64C 30/00* | (2006.01) |
| *B23K 20/00* | (2006.01) |
| *B21D 39/03* | (2006.01) |
| *B64C 1/00* | (2006.01) |

(52) U.S. Cl.
CPC .............. *B64C 1/38* (2013.01); *B21D 39/031* (2013.01); *B32B 3/26* (2013.01); *B64C 30/00* (2013.01); *B32B 2605/18* (2013.01); *B64C 2001/0072* (2013.01)

(58) Field of Classification Search
CPC ......... B32B 3/26; B32B 3/12; B32B 2605/18; B64C 1/38; B64C 1/00; B64C 30/00
See application file for complete search history.

(56) References Cited

U.S. PATENT DOCUMENTS

| | | | |
|---|---|---|---|
| 4,217,397 A | 8/1980 | Hayase et al. | |
| 4,916,027 A | * 4/1990 | DelMundo | .............. B32B 15/01 428/586 |

(Continued)

FOREIGN PATENT DOCUMENTS

| | | |
|---|---|---|
| EP | 2615400 A2 | 7/2013 |
| GB | 2295981 A1 | 6/1996 |
| WO | 2014200499 A1 | 12/2014 |

OTHER PUBLICATIONS

Search Report for related European Application No. 20194918.7; dated Feb. 16, 2021.

*Primary Examiner* — Joanna Pleszczynska
(74) *Attorney, Agent, or Firm* — von Briesen & Roper, s.c.

(57) ABSTRACT

An exterior panel for hypersonic transport vehicles is formed of a superplastic metal alloy such as titanium for accommodating high thermal stresses of hypersonic flight. The exterior panel, designed as re-usable on such transport vehicles, includes an exterior skin configured for atmospheric exposure, and an interior skin configured for attachment to structural frame members of the transport vehicles. An intermediate skin is situated between a pair of multicellular cores; each multicellular core is sandwiched between the exterior and interior skins, one core being situated between the exterior and intermediate skins, while the other is situated between the intermediate and interior skins. An airflow channel (AFC) extends through at least one of the multicellular cores for cooling of the exterior panel. Each multicellular core is superplastic formed and diffusion bonded to the other, as well as to its respective pair of skins to form an exterior panel having a unified structure.

20 Claims, 5 Drawing Sheets

(56) References Cited

U.S. PATENT DOCUMENTS

| | | | |
|---|---|---|---|
| 5,955,207 A * | 9/1999 | Lederich | B64C 1/12 |
| | | | 148/516 |
| 6,138,898 A * | 10/2000 | Will | B21D 26/055 |
| | | | 228/157 |
| 9,079,674 B1 | 7/2015 | Grillos et al. | |
| 9,623,977 B2 | 4/2017 | Runyan et al. | |
| 2017/0241577 A1 * | 8/2017 | Schell | B23K 20/02 |

* cited by examiner

REINFORCED SUPERPLASTIC FORMED AND DIFFUSION BONDED STRUCTURES

FIELD

The present disclosure relates to superplastic formed and diffusion bonded (SPF/DB) sandwich structures for aerospace applications.

BACKGROUND

Thermal loads imposed on exterior surfaces of high speed aerospace transport vehicles present significant and continuing demands for improved thermal management strategies.

Exterior structures formed of titanium alloys are known to be effective for accommodating high heat flux environments at supersonic speeds. For hypersonic speeds, however, additional heat compensating mechanisms are sought. Ceramic tiles have been used on spacecraft, particularly for managing thermal loads upon atmospheric reentry from space. Nickel alloys have also been utilized in some structures. However, the latter have proven to be heavier and more expensive in terms of their respective structural builds and fuel demands. In addition, such previous thermal protections for hypersonic vehicles have not been re-usable, limiting their usefulness in commercial applications.

Thus, less costly structures that may effectively accommodate temperatures at hypersonic speeds are desired.

SUMMARY

In accordance with one aspect of the present disclosure, an exterior panel for a transport vehicle includes an exterior skin configured for atmospheric exposure, and an interior skin configured for attachment to a structural frame member of the transport vehicle. An intermediate skin, spaced below the exterior skin, is sandwiched between the exterior and interior skins. A pair of multicellular cores imparts strength to the exterior panel, and an airflow channel (AFC) extends through at least one of the multicellular cores. One of the multicellular cores is situated between the exterior and intermediate skins; the other is situated between the intermediate and the interior skins. Each core is superplastic formed and diffusion bonded to its respective pair of skins.

In accordance with another aspect of the present disclosure, a transport vehicle includes at least one exterior panel having an exterior skin configured for atmospheric exposure. The exterior panel includes an interior skin configured for attachment to a structural frame member of the transport vehicle. An intermediate skin, situated between a pair of multicellular cores, is sandwiched between the exterior and interior skins. One multicellular core is situated between the exterior and intermediate skins, and the other is situated between the intermediate and the interior skin. An airflow channel (AFC) extends through one of the multicellular cores so as to underlie the exterior skin. Each multicellular core is superplastic formed and diffusion bonded to its respective pair of skins, and the multicellular cores impart tensile and compressive strength to the exterior panel.

In accordance with yet another aspect of the present disclosure, a method of manufacturing an exterior panel for a transport vehicle includes providing an exterior skin of a superplastic material configured for atmospheric exposure and an intermediate skin of a superplastic material, with the intermediate skin to be spaced below the exterior skin. The method further includes providing an interior skin of a superplastic material, with the interior skin spaced below the intermediate skin, and configured for attachment to a structural frame member of the transport vehicle. The method further includes providing a pair, consisting of a top and a bottom, of core sheets of a superplastic material to form a multicellular core between each of a) the exterior skin and the intermediate skin, and b) the intermediate skin and the interior skin. The method further includes bonding at least one of the pairs of core sheets together via arrays of intermittent seam welds oriented in a predetermined stiffener pattern to create at least one airflow channel adjacent the exterior skin, then fusion welding the edges of both pairs of core sheets together, and securing an expansion pipe to one edge of each of the pair of the core sheets. Finally, the method includes placing the exterior skin, the intermediate skin, and the interior skin, with the core sheets sandwiched between the respective skins, into a forming press, supplying an inert gas into the expansion pipes to superplastic form and diffusion bond the skins and core sheets, to create multicellular cores that are integrally bonded to the exterior, intermediate, and interior skins.

The features, functions, and advantages disclosed herein can be achieved in examples presented herein, or may be provided in yet other variations, the details of which may be better appreciated with reference to the following description and drawings.

The referenced drawings are not necessarily to scale, and any disclosed examples are illustrated only schematically. Aspects of the disclosed examples may be combined with or substituted for one another, and within various systems and environments that are neither shown nor described herein. As such, the following detailed description is merely exemplary, and not intended to be limiting in either application or use.

DETAILED DESCRIPTION

The following detailed description includes apparatus and methods for carrying out the present disclosure. Actual scope of the disclosure is as defined in the appended claims.

Figure 1:
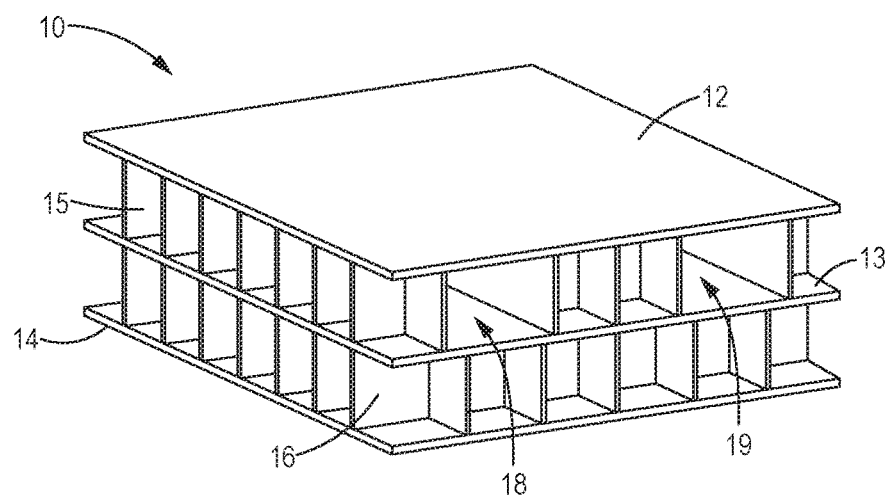
FIG. 1 is a perspective view of one example of an exterior panel for use as an aerodynamically exposed surface of a hypersonic transport vehicle, constructed in accordance with the present disclosure.

FIG. 1 displays an example of an exterior panel 10 that may be useful as a re-usable exterior surface of a hypersonic transport vehicle. The exterior panel 10 includes an exterior skin 12, a septum that is herein called an intermediate skin 13, and an interior skin 14. Upper and lower multicellular cores 15 and 16 are sandwiched between respective pairs of skins, as shown. The multicellular cores 15 and 16 provide tensile and compressive strength to the exterior panel 10 under high heat flux environments associated with hypersonic speeds. As disclosed herein, all of the described structures may be formed of a superplastic material such as titanium alloy.

Situated within the upper multicellular core 15 are a pair of integrally formed airflow channels 18, 19, which may be adapted for cooling the exterior panel 10, and particularly the exterior skin 12. For example, the airflow channels 18, 19 may be designed to provide controlled flows of cooling air through a plurality of exterior panels 10 upon descent of a hypersonic transport vehicle prior to landing.

Figure 2:
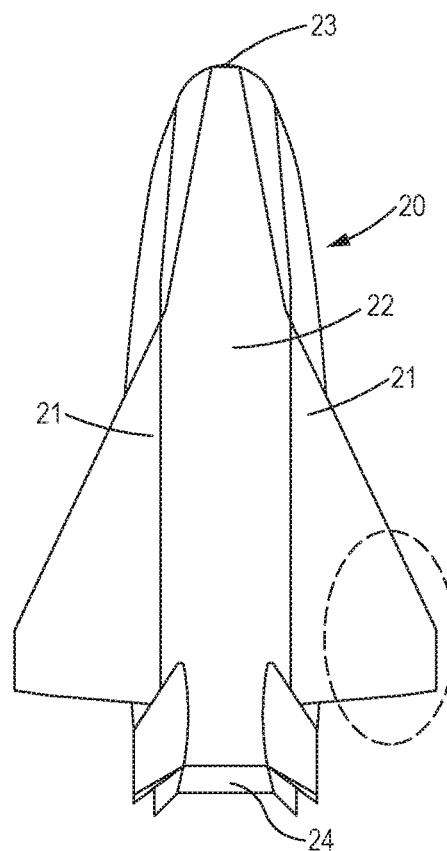
FIG. 2 is a perspective view of a hypersonic transport vehicle of a type that may employ the exterior panel of FIG. 1.
Figure 2A:
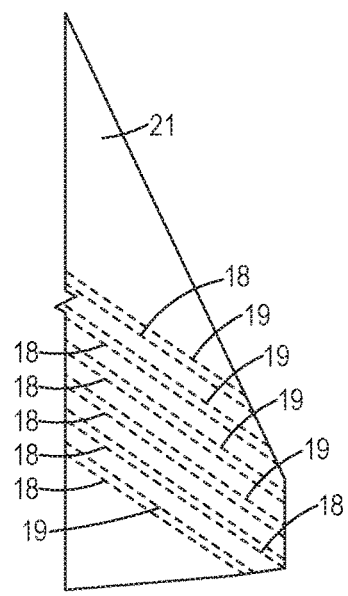
FIG. 2A is an enlarged view of an inset portion of FIG. 2, schematically depicting application of a plurality of exterior panels on the transport vehicle, each exterior panel including aligned air channels (with orientations reflected by dotted lines), configured to cool the exterior panels, in accordance with one example of the present disclosure.

Referring now also to FIG. 2, an exemplary passenger-carrying hypersonic transport vehicle 20 incorporates structural frame members 21, including a pair of wings designed to support the transport vehicle 20 in flight. The transport vehicle 20 includes a fuselage 22, a nose 23, and a thrust nozzle 24 of an engine (not shown), for accommodating travel at speeds of Mach 3 to 5 within the stratosphere, i.e. at altitudes of at least 100,000 feet. FIG. 2A displays an inset portion of FIG. 2, depicting one arrangement of a plurality of the exterior panels 10, which overlie and comprise at least a portion of the wing 21. In the latter inset portion, one exemplary orientation of otherwise hidden airflow channels 18 and 19, contained within a plurality of adjoining and aligned exterior panels 10, is revealed by the dotted lines in FIG. 2A. The interior skins 14 of the exterior panels 10 in such case may be fusion welded or otherwise secured to the structural frame member 21, e.g. wings, of the transport vehicle 20. In addition, each of the exterior panels 10 may be fusion welded to one or more adjacent exterior panels 10.

Figure 3:
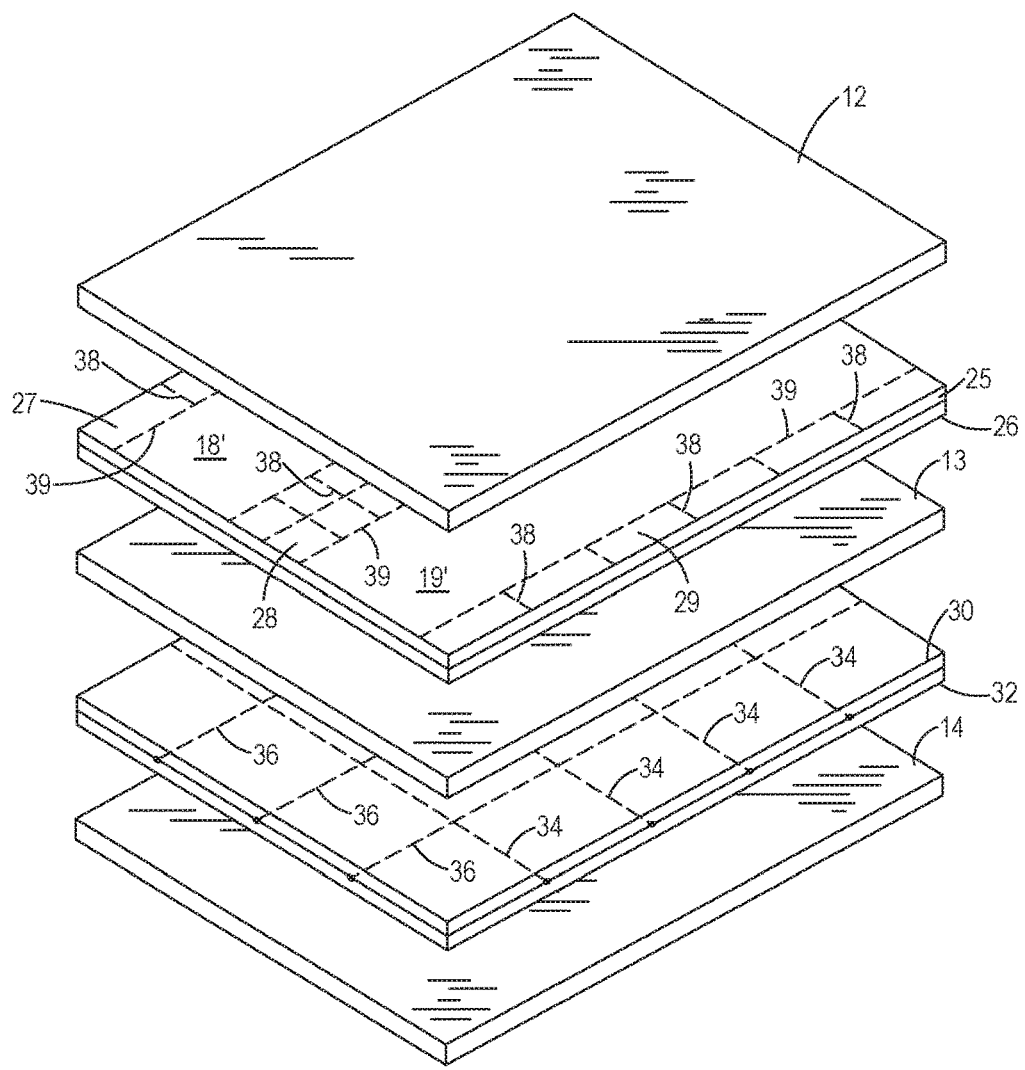
FIG. 3 is an exploded perspective view of components of the exterior panel of FIG. 1, as the components would appear during an initial manufacturing step, including exterior, intermediate, and interior skins along with pairs of upper and lower pairs of core sheets sandwiched between respective skins, and depicting intermittent weld patterns effective to produce airflow channels, in accordance with one example of the present disclosure.

FIG. 3 depicts the above-described components of the exterior panel 10, including the exterior, intermediate, and interior skins 12, 13, 14, with upper top and bottom core sheets 25, 26, as well as lower top and bottom core sheets 30, 32, positioned between respective pairs of the skins 12, 13, 14. FIG. 3 displays a stage of manufacture, which would of course be prior to formation of a completed exterior panel 10 (FIG. 1) containing the noted upper and lower multicellular cores 15 and 16. Thus, as will be appreciated, the multicellular cores 15 and 16 of the exterior panel 10 are physically constructed of the described upper and lower pairs of top and bottom core sheets 25, 26 and 30, 32 (FIG. 3), all of the core sheets consisting of a superplastic material such as a titanium alloy.

Formation of the multicellular cores 15 and 16 occurs during a process of superplastic forming and diffusion bonding (SPF/DB) of the core sheets to the skins 12, 13, 14, within a forming press to be described, to assure permanent integration of the cores 15 and 16 with the exterior, intermediate, and interior skins 12, 13, 14. For this purpose, the upper and lower sets of respective top and bottom core sheets 25, 26 and 30, 32 are fusion welded together along their first and second orthogonal orientations 34, 36 (lower) or first and second orthogonal orientations 38, 39 (upper) of intermittent seam welds, as shown. The intermittent seam welds are essentially spot welds, resulting in small vent holes for balancing gas pressures during the SPF/DB manufacturing process. The first and second orientations 34, 36 of the lower top and bottom core sheets 30, 32 are orthogonally oriented relative to each other in a predetermined pattern, such that application of gas pressure between those core sheets will create a plurality of spaced multicellular cores defined by uniformly arranged individual cells, as further detailed below. On the other hand, first, second, and third spaced arrays 27, 28, 29 of the intermittent seam welds 38, 39 of the upper top and bottom core sheets 25, 26 are strategically spaced apart by a predetermined distance, so as to create open seam weld pattern layouts 18' and 19' designed to become airflow channels 18 and 19 in the completed, i.e. manufactured, exterior panel 10 (FIG. 1).

Titanium is a material that is both superplastic and suitable for diffusion bonding. Thus, the term "SPF/DB" as applied herein means a manufacturing process in which occurs a solid-state joinder of metallic surfaces under application of heat and pressure for a time duration sufficient to create a co-mingling of atoms at the joint interface of parts being bonded. As such, the SPF/DB process involves a diffusion process during superplastic expansion, but short of causing the joined surfaces to physically melt. In contrast, fusion bonding or welding, as applied herein, refers to metallurgical joining of metallic surfaces by applying sufficient heat to cause the materials at their joint interface to physically melt, i.e. to reach a liquid or plastic state while being joined together.

Figure 4:
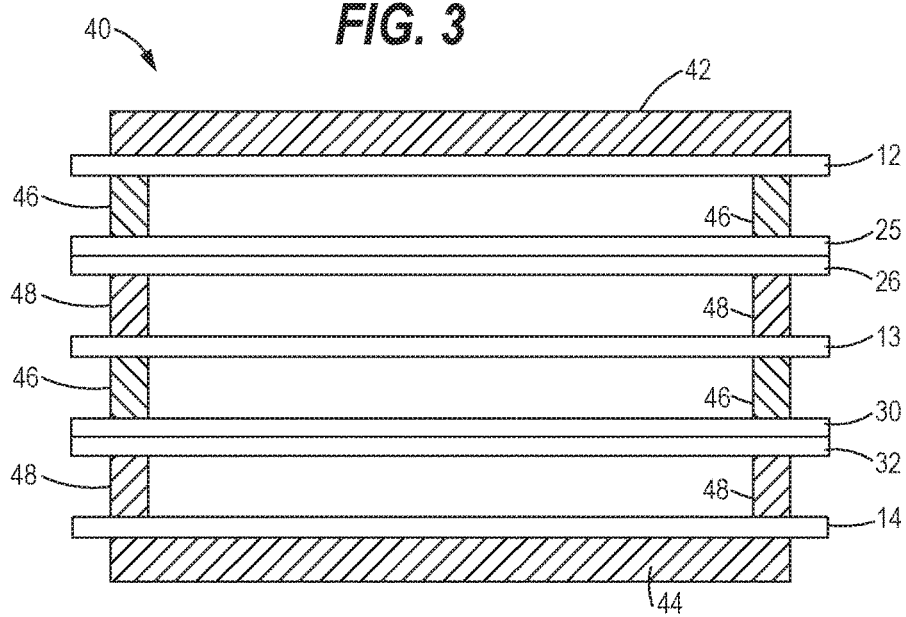
FIG. 4 is a cross-sectional side view of a forming fixture containing the components of FIG. 3, during manufacture of the disclosed exterior panel.

Referring now to FIG. 4, a fixture 40 may be used to contain the above-described components of FIG. 3 during manufacture of the exterior panel 10. The fixture 40 is defined by an upper frame member 42 and a lower frame member 44 for supporting the respective exterior, intermediate, and interior skins 12, 13, 14. Upper and lower spacers 46, 48 are used as standoff supports to assure a predetermined desired spacing between the respective core sheets 25, 26 and 30, 32 and the respective exterior, intermediate, and interior skins 12, 13, 14, between which the core sheets are placed and held. The skins and core sheets are subsequently transformed under the high pressure, high temperature SPF/DB manufacturing process into the exterior panel 10, which includes the multicellular cores 15 and 16. Although use of upper and lower spacers 46, 48 are shown in the disclosed fixture 40, manufacturing without such standoff supports may also be viable.

Figure 5A:
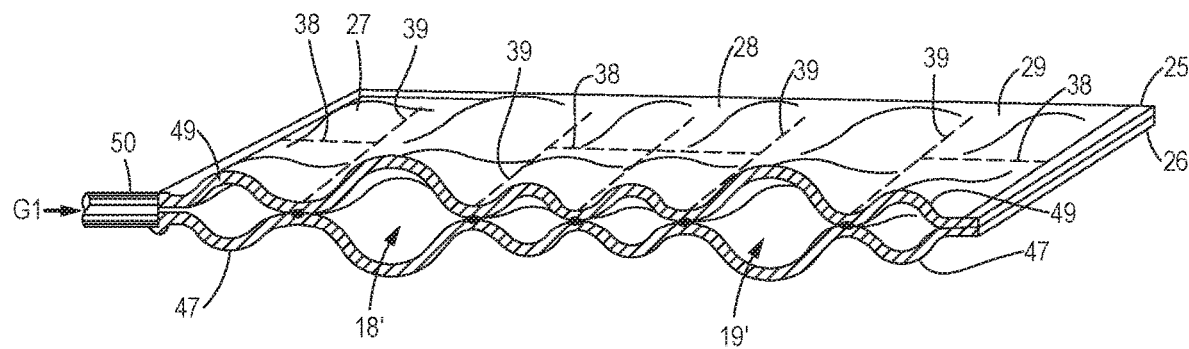
FIG. 5A is a schematic perspective view of the upper pair of core sheets undergoing expansion during manufacture of the exterior panel.
Figure 6:
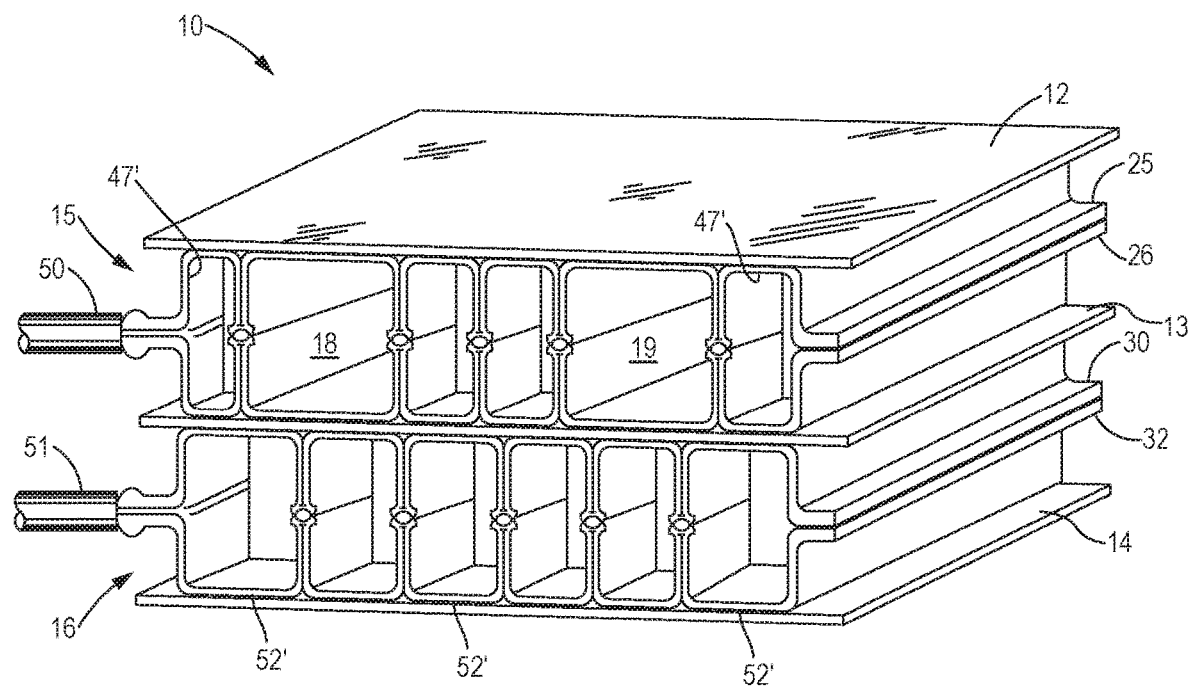
FIG. 6 is a perspective view of an exterior panel that incorporates a pair of airflow channels situated in an upper multicellular core, the view displaying a pair of multicellular cores created from upper and lower pairs of core sheets that have been fully expanded between the exterior, intermediate, and interior skins during manufacture.

Referring now to FIG. 5A, a perspective cross-section of the upper top and bottom core sheets 25, 26 depicts expansion of the latter core sheets during manufacture of the exterior panel 10, after an expansion pipe 50 has been secured by fusion welding to one edge of the upper top and bottom core sheets 25, 26. All edges of the latter core sheets are then fusion welded together, and an inert gas G1 is supplied at a high pressure into the expansion pipe 50. Referring now also to FIG. 6, it may be appreciated that the pressure exerted by the gas G1 through the expansion pipe 50 on the first, second, and third spaced arrays 27, 28, 29, having orientations 38, 39 of intermittent seam welds as shown, is effective to produce bulged out portions 47 (FIG. 5A) of the bottom core sheet 26, and corresponding bulged out portions 49 (FIG. 5A) of the upper core sheet 25, ultimately transforming the core sheets 25, 26 into fully formed cell structures 47' (FIG. 6), to define the upper multicellular core 15 (FIG. 6).

Figure 5B:
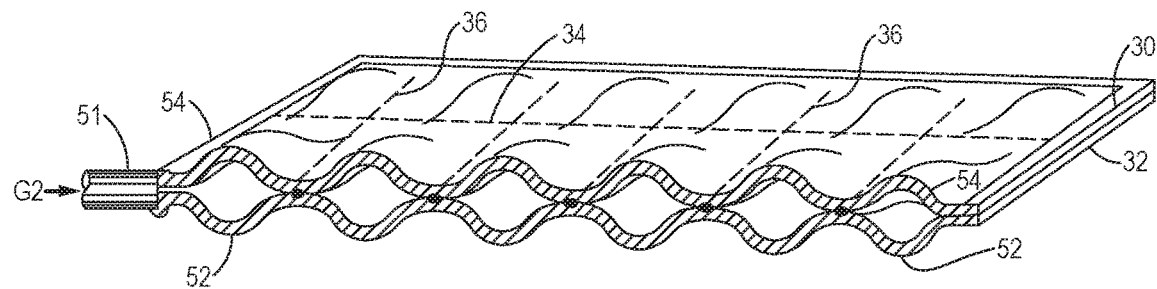
FIG. 5B is a schematic perspective view of the lower pair of core sheets undergoing expansion during manufacture of the exterior panel.

Referring now also to FIG. 5B, a perspective cross-section of the lower top and bottom core sheets 30, 32 depicts their expansion during a simultaneous manufacturing step, albeit after a second expansion pipe 51 has been secured by fusion welding to one edge of the latter core sheets. All edges of the core sheets 30, 32 are then fusion welded together, and an inert gas G2 is supplied at a high pressure into the expansion pipe 51. Referring again to FIG. 6, the pressure of the gas G2 on first and second orientations 34, 36 of intermittent seam welds produces bulged out portions 52 (FIG. 5B) of the bottom core sheet 32, along with corresponding bulged out portions 54 (FIG. 5B) of the upper core sheet 30, ultimately transforming the latter top and bottom core sheets into fully formed cell structures 52' (FIG. 6) to define the lower multicellular core 16 (FIG. 6).

It is noteworthy that visible lines of delineation or demarcation between components, i.e. of the exterior, intermediate, and interior skins 12, 13, 14, along with their respective upper and lower supporting cores 15, 16, all schematically displayed in FIG. 6, are only for the purpose of describing how the components fit together prior to the SPF/DB manufacturing process. Indeed, after such manufacture of the exterior panel 10, any cross-section taken will reveal no visible lines of demarcation, as the components will have then become integrally bonded together into a unified structure.

Continuing reference to FIG. 6, it will be appreciated that final shapes of the individual cells 47', 52' of the cores 15, 16 of the superplastic formed and diffusion bonded exterior panel 10 are constrained by the above-described intermittent seam welds having the first and second orientations 34, 36 and first, second, and third arrays 27, 28, 29, respectively, as well as the exterior, intermediate, and interior skins 12, 13, 14. In the disclosed example, the final shape of the airflow channel is also controlled by the above-described predetermined weld patterns.

Figure 7:
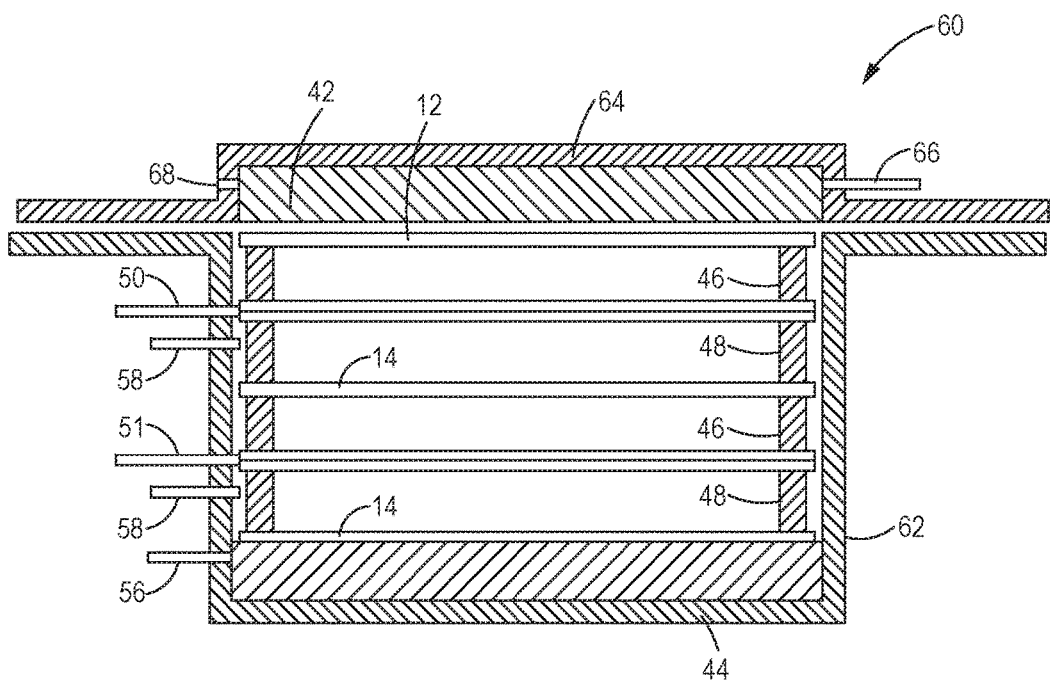
FIG. 7 depicts a forming press for accommodating the fixture of FIG. 4, to superplastic form and diffusion bond the exterior panel of this disclosure.

Referring now also to FIG. 7, a superplastic forming press 60, includes a lower member, such as a containment box 62, and an upper member, such as a containment box cover 64 configured to be secured to the containment box 62. It will be appreciated that the fixture 40 of FIG. 4, containing above-described individual components of a pre-manufactured exterior panel 10 (FIG. 3), is inserted into the superplastic forming press 60 to manufacture each completed exterior panel 10 via SPF/DB process. For this purpose, an inert gas G, such as argon, may be used to pressure form the exterior panel 10; such gas may be introduced into the as-described upper and lower sets of core sheets at pressures G1 and G2, respectively. The latter pressures may be equal, particularly if such structure is comprised of a homogeneous superplastic formable material, such as the described titanium alloy. Other inert gases besides argon may also be appropriate for the noted components.

Continuing reference to FIG. 7, prior to pressuring the superplastic forming press 60, a purging of atmospheric air from the superplastic forming press 60 is first conducted, using an noncorrosive gas, again for example argon, since atmospheric air can be corrosive at SPF/DB manufacturing temperatures approaching 1700° F. For this purpose, purging and vacuum tubes such as a vacuum tube 56, purge tubes 58, an upper purge tube 66, and a purge vent 68, are all schematically shown as exemplary structures for accommodating a pre-manufacturing purge. After each instance of the SPF/DB manufacture of an exterior panel 10 is completed, the finished exterior panel 10 (e.g., FIG. 1) is removed from the superplastic forming press and trimmed Thus, FIG. 1 depicts a completed, fully trimmed, exterior panel 10, i.e. having been removed from the superplastic forming press 60 and the fixture 40, and with the expansion pipe 50 removed.

It may be noted that during hypersonic flight steady-state operating temperatures of the exterior skin 12 of an exterior panel 10 made of titanium alloy may range as high as 1100 to 1200° F. The exterior skin 12 may have a thickness ranging from 5 thousandths inch up to approximately 60 thousandths inch. Moreover, the airflow channels may be ducted (not shown) to become active for cooling only during descent of the transport vehicle 20. The thickness of the core sheets 25, 26 and 30, 32 may be in the range of 1 mm or 40 thousandths inch, and the intermediate and interior skins 13, 14 may have a thickness comparable to or somewhat less than that of the exterior skin 12. The pressure of gas G1 and G2 may range between 200-500 psi during the SPF/DB manufacturing process.

Figure 8:
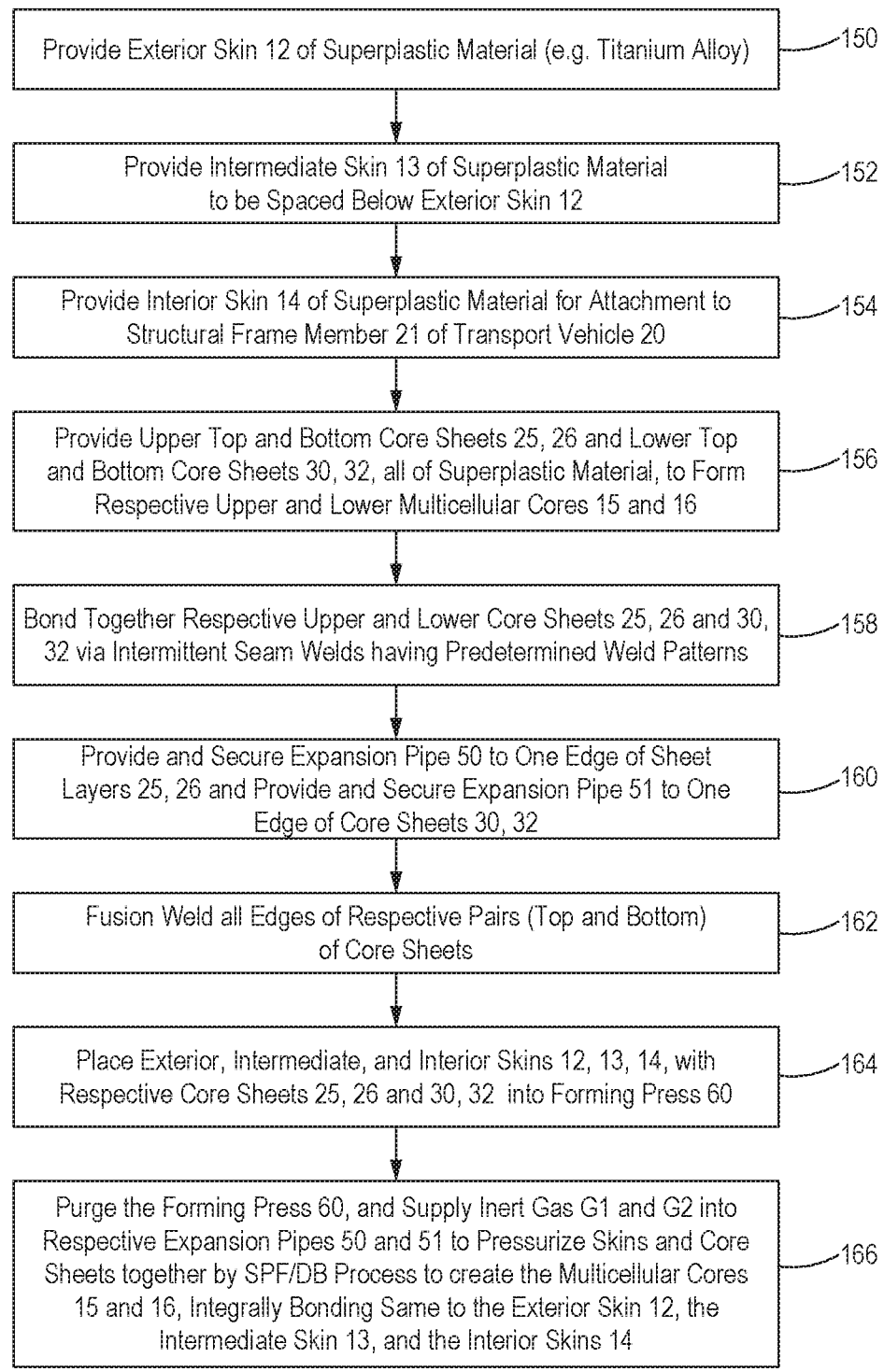
FIG. 8 displays a sequence of method steps for making the exemplary exterior panel of FIG. 1.

Referring now to FIG. 8, a method of making the exemplary exterior panel 10 (of FIG. 1) for a transport vehicle 20 (FIG. 2) includes a step 150 of providing an exterior skin 12 of a superplastic material (e.g. a titanium alloy) configured for atmospheric exposure. The method further provides a step 152 of providing an intermediate skin 13 of superplastic material to be spaced below the exterior skin 12, and a step 154 of providing an interior skin 14, also of a superplastic material, for attachment to a structural frame member such as a wing 21 of the transport vehicle 20. The method next includes the step 156 of providing upper and lower pairs of top and bottom core sheets 25, 26 and 30, 32, also of superplastic material, each pair for forming one of two multicellular cores 15, 16 between the exterior skin 12 and the intermediate skin 13, and between the intermediate skin 13 and the interior skin 14. Next, in accordance with step 158, the respective pairs of core sheets 25, 26 and 30, 32 are bonded together via intermittent seam welds having predetermined weld patterns (FIG. 3).

In accordance with step 160, expansion pipes 50 and 51 are next each secured to one edge of respective core sheets 25, 26 and 30, 32, and in step 162 a fusion weld is applied about all edges of the respective pairs of core sheets. In step 164, the exterior, intermediate and interior skins 12, 13, 14 are placed along with respective core sheets 25, 26 and 30, 32 into the fixture 40, which is then placed into the forming press 60. In step 166, the superplastic forming press 60 is purged, and an inert gas G1 and G2 is supplied into each of the respective expansion pipes 50, 51 to superplastic pressurize all skins and core sheets to create the multicellular cores 15, 16 that become integrally bonded to the exterior, intermediate and interior skins 12, 13, 14.

As noted above, during the SPF/DB process, pressures of 200-500 psi may be reached during the described superplastic formation of the exterior panel 10.

Although only a few examples and method steps have been described herein, this disclosure may admit to yet other variations and modifications neither described nor suggested. For example, although not described above, the exterior panel 10 may have other multicellular core configurations, resulting in significantly lighter, simpler, and less costly structures. For example, the multicellular core may be formed of only a single core sheet layer in some envisioned examples. Moreover, inert gases other than argon may be utilized in the SPF/DB process to manufacture the exterior panels 10. Also, it is envisioned that superplastic formable material compositions other than titanium materials may be employed for manufacture of the disclosed exterior panel 10, to the extent that the high strength and tensile properties of such compositions can remain intact in environments exceeding 1200 degrees Fahrenheit. Finally, several other viable methods not described herein can be envisioned for manufacturing the exterior panel 10, as may be appreciated by those skilled in the art.

Clause 1. An exterior panel for a transport vehicle, the exterior panel comprising:
an exterior skin configured for atmospheric exposure;
an intermediate skin spaced below the exterior skin;
an interior skin spaced below the intermediate skin, and configured for attachment to a structural frame member of the transport vehicle;
a first superplastic formed multicellular core sandwiched between the exterior skin and the intermediate skin, and a second superplastic formed multicellular core sandwiched between the intermediate skin and the interior skin;
wherein the multicellular cores are superplastic formed and diffusion bonded respectively to the exterior and intermediate skins, and to the intermediate and interior skins, and wherein at least one of the multicellular cores comprises an air flow channel.

Clause 2. The exterior panel of Clause 1, wherein the exterior, intermediate, and interior skins are formed of a superplastic material.

Clause 3. The exterior panel of Clauses 1 or 2, wherein the airflow channel is integrally formed within the exterior panel.

Clause 4. The exterior panel of any of Clauses 1-3, wherein the multicellular cores impart tensile and compressive strength to the exterior panel.

Clause 5. The exterior panel of any of Clauses 1-4, wherein there are at least two airflow channels underlying the exterior skin.

Clause 6. The exterior panel of any of Clauses 1-5, wherein the airflow channel is configured to cool the exterior panel.

Clause 7. The exterior panel of any of Clauses 1-6, wherein the airflow channel is formed of three arrays of intermittent seam welds on a pair of core sheets each array being spaced apart from the others.

Clause 8. A transport vehicle having at least one exterior panel, the at least one exterior panel comprising:
an exterior skin configured for atmospheric exposure;
an intermediate skin spaced below the exterior skin;
an interior skin spaced below the intermediate skin, and configured for attachment to a structural frame member of the transport vehicle;
a first superplastic formed multicellular core sandwiched between the exterior skin and the intermediate skin, and a second superplastic formed multicellular core sandwiched between the intermediate skin and the interior skin;
the intermediate skin and the multicellular cores configured to provide tensile and compressive strength to the exterior panel;
wherein the multicellular cores are superplastic formed and diffusion bonded respectively to the exterior and intermediate skins, and to the intermediate and interior skins, wherein one of the multicellular cores comprises an air flow channel; and wherein the airflow channel underlies and cools the exterior skin.

Clause 9. The transport vehicle of Clause 8, wherein the transport vehicle is a hypersonic vehicle having a plurality of exterior panels, and wherein each exterior panel is fusion welded to at least one other exterior panel.

Clause 10. The transport vehicle of Clause 9, wherein each airflow channel within each of the plurality of exterior panels is integrally formed.

Clause 11. The transport vehicle of any of Clauses 8-10, wherein the airflow channel is configured to cool the exterior panel.

Clause 12. The transport vehicle of any of Clauses 8-11, wherein the airflow channel is formed by three arrays of intermittent seam welds on a pair of core sheets, each array being spaced apart from the others.

Clause 13. A method of manufacturing an exterior panel for a transport vehicle, the method comprising:
providing an exterior skin of a superplastic material configured for atmospheric exposure;
providing an intermediate skin of a superplastic material to be spaced below the exterior skin;
providing an interior skin of a superplastic material for attachment to a structural frame member of the transport vehicle;
providing first and second pairs of core sheets of a superplastic material for forming one multicellular core between each of the exterior skin and the intermediate skin, and the intermediate skin and the interior skin;
bonding one of the pairs of core sheets with intermittent seam welds oriented in a predetermined stiffener pattern sufficient to create at least one airflow channel adjacent the exterior skin;
providing and securing one expansion pipe to one edge of each of the pair of core sheets, and fusion welding all edges of each pair of core sheets; and
placing the exterior skin, the intermediate skin, and the interior skin with the respective core sheets into a forming press, supplying an inert gas into expansion pipes to superplastic form and diffusion bond the exterior, intermediate, and interior skins and core sheets, to create multicellular cores that are integrally bonded to the exterior, intermediate, and interior skins.

Clause 14. The method of Clause 13, wherein the airflow channel is integrally formed within the exterior panel.

Clause 15. The method of Clauses 13 or 14, wherein all components are formed of a titanium alloy.

Clause 16. The method of any of Clauses 13-15, wherein the multicellular cores impart tensile and compressive strength to the exterior panel.

Clause 17. The method of any of Clauses 13-16, wherein there are at least two airflow channels in one of the multicellular cores.

Clause 18. The method of any of Clauses 13-17, wherein the airflow channel is formed of three arrays of intermittent seam welds on a pair of core sheets, each array being spaced apart from the others.

Clause 19. The method of Clause 18, wherein each of the three arrays of intermittent seam welds secure together the pair of core sheets during manufacture of the exterior panel.

Clause 20. The method of any of Clauses 13-19, wherein the airflow channel is configured to cool the exterior skin.

What is claimed is:
1. An exterior panel for a transport vehicle, the exterior panel comprising:
an exterior skin configured for atmospheric exposure;

an intermediate skin spaced below the exterior skin;
an interior skin spaced below the intermediate skin, and configured for attachment to a structural frame member of the transport vehicle;
a first multicellular core sandwiched between the exterior skin and the interior skin, the first multicellular core comprising a pair of core sheets of a superplastic material bonded together via intermittent seam welds, the intermittent seam welds bonding the first pair of core sheets forming a first spaced array, a second spaced array, and a third spaced array of intermittent seam welds;
a second multicellular core sandwiched between the intermediate skin and the interior skin, the second multicellular core comprising a pair of core sheets of a superplastic material bonded together via intermittent seam welds; and
wherein the first multicellular core is superplastic formed and diffusion bonded to the exterior skin and the intermediate skin, and the second multicellular core is superplastic formed and diffusion bonded to the intermediate skin and the interior skin, and wherein the first superplastic formed multicellular core comprises a first airflow channel formed between the first spaced array and the second spaced array underlying the exterior skin and a second airflow channel formed between the second spaced array and the third spaced array underlying the exterior skin.

2. The exterior panel of claim 1, wherein each of the exterior skin, the intermediate skin, and the interior skin is formed of a superplastic material.

3. The exterior panel of claim 1, wherein the airflow channels are integrally formed within the exterior panel.

4. The exterior panel of claim 1, wherein the multicellular cores impart tensile and compressive strength to the exterior panel.

5. The exterior panel of claim 1, wherein the first airflow channel and the second airflow channel are configured to provide controlled flows of cooling air through a plurality of the exterior panels.

6. The exterior panel of claim 1, wherein the first airflow channel and the second airflow channel are configured to cool the exterior panel.

7. The exterior panel of claim 1, wherein the exterior panel only has two airflow channels.

8. A transport vehicle having at least one exterior panel, the at least one exterior panel comprising:
an exterior skin configured for atmospheric exposure;
an intermediate skin spaced below the exterior skin;
an interior skin spaced below the intermediate skin, and configured for attachment to a structural frame member of the transport vehicle;
a first pair of core sheets forming a first superplastic formed multicellular core sandwiched between the exterior skin and the intermediate skin, and a second pair of core sheets forming a second superplastic formed multicellular core sandwiched between the intermediate skin and the interior skin, in which the first pair of core sheets are a superplastic material bonded together via intermittent seam welds, the intermittent seam welds bonding the first pair of core sheets forming a first spaced array, a second spaced array, and a third spaced array of intermittent seam welds, and the second pair of core sheets are a superplastic material bonded together via intermittent seam welds;
the intermediate skin and the multicellular cores configured to provide tensile and compressive strength to the exterior panel; and
wherein the multicellular cores are superplastic formed and diffusion bonded respectively to the exterior skin and the intermediate skin, and to the intermediate skin and the interior skin, wherein the first superplastic formed multicellular core comprises a first airflow channel formed between the first spaced array and the second spaced array, and a second airflow channel formed between the second spaced array and the third spaced array, and wherein the first airflow channel and the second airflow channel underly, are adjacent to, and cool the exterior skin.

9. The transport vehicle of claim 8, wherein the transport vehicle is a hypersonic vehicle having a plurality of exterior panels, and wherein each exterior panel is fusion welded to at least one other exterior panel.

10. The transport vehicle of claim 9, wherein each airflow channel within each of the plurality of exterior panels is integrally formed.

11. The transport vehicle of claim 8, wherein the first airflow channel and the second airflow channel are configured to cool the exterior panel.

12. The transport vehicle of claim 8, wherein the first airflow channel and the second airflow channels are configured to provide controlled flows of cooling air through a plurality of the exterior panels.

13. A method of manufacturing an exterior panel for a transport vehicle, the method comprising:
providing an exterior skin of a superplastic material configured for atmospheric exposure;
providing an intermediate skin of a superplastic material to be spaced below the exterior skin;
providing an interior skin of a superplastic material for attachment to a structural frame member of the transport vehicle;
providing a first pair of core sheets of a superplastic material for forming a first multicellular core between the exterior skin and the intermediate skin;
providing a second pair of core sheets of the superplastic material for forming a second multicellular core between the intermediate skin and the interior skin;
bonding the first pair of core sheets with a first spaced array, a second spaced array, and a third spaced array of intermittent seam welds oriented in a predetermined stiffener pattern sufficient to create a first airflow channel formed between the first spaced array and the second spaced, array and a second airflow channel formed between the second spaced array and the third spaced array, the first airflow channel and the second airflow channel are adjacent to, and underly, the exterior skin;
providing and securing one expansion pipe to one edge of each of the pairs of core sheets, and fusion welding all edges of each pair of core sheets; and
placing the exterior skin, the intermediate skin, and the interior skin with the respective core sheets into a forming press, supplying an inert gas into expansion pipes to superplastic form and diffusion bond each of the exterior skin, the intermediate skin, the interior skin, and the core sheets so that the multicellular cores are integrally bonded to the exterior skin, the intermediate skin, and the interior skin.

14. The method of claim 13, wherein the first airflow channel and the second airflow channels are integrally formed within the exterior panel.

15. The method of claim 13, wherein all components are formed of a titanium alloy.

16. The method of claim 13, wherein the multicellular cores impart tensile and compressive strength to the exterior panel.

17. The method of claim 13, wherein there are only two airflow channels in one of the multicellular cores.

18. The method of claim 13, wherein the first airflow channel and the second airflow channels are configured to provide flows of cooling air through a plurality of the exterior panels.

19. The method of claim 18, wherein each of the three arrays of intermittent seam welds secure together the pair of core sheets during manufacture of the exterior panel.

20. The method of claim 13, wherein the first airflow channel and the second airflow channel are configured to cool the exterior skin.

\* \* \* \* \*